United States Patent
Xu et al.

(10) Patent No.: US 10,567,933 B2
(45) Date of Patent: Feb. 18, 2020

(54) METHOD AND APPARATUS FOR ALLOCATING RESOURCES FOR V2X MESSAGE TRANSMISSION IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/074,563

(22) PCT Filed: Feb. 6, 2017

(86) PCT No.: PCT/KR2017/001276
§ 371 (c)(1),
(2) Date: Aug. 1, 2018

(87) PCT Pub. No.: WO2017/135783
PCT Pub. Date: Aug. 10, 2017

(65) Prior Publication Data
US 2019/0058981 A1 Feb. 21, 2019

Related U.S. Application Data

(60) Provisional application No. 62/292,243, filed on Feb. 6, 2016.

(51) Int. Cl.
*H04W 72/08* (2009.01)
*H04W 4/40* (2018.01)
(Continued)

(52) U.S. Cl.
CPC ............. *H04W 4/40* (2018.02); *H04W 4/06* (2013.01); *H04W 72/005* (2013.01); *H04W 72/087* (2013.01)

(58) Field of Classification Search
CPC ..... H04W 92/18; H04W 72/005; H04W 4/44; H04W 4/40; H04W 4/06
See application file for complete search history.

(56) References Cited

U.S. PATENT DOCUMENTS

2012/0134311 A1  5/2012  Zhai et al.
2013/0188546 A1  7/2013  Turtinen et al.
(Continued)

FOREIGN PATENT DOCUMENTS

GB   2498575 A       7/2013
WO   2014012244 A1   1/2014

OTHER PUBLICATIONS

Mitsubishi Electric, "MBMS Architectures for Local and Remote V2X Application Servers," R3-160315, 3GPP TSG RAN WG3 Meeting #90, Anaheim, CA, Feb. 5, 2016, see section 2; and figure 1.

(Continued)

*Primary Examiner* — Wei Zhao
(74) *Attorney, Agent, or Firm* — Dentons US LLP

(57) ABSTRACT

Upon receiving an uplink (UL) V2X message from a vehicle user equipment (UE) or a road side unit (RSU) UE, a vehicle-to-everything (V2X) application server determines information on resource allocation for a downlink (DL) V2X message and transmits the information on resource allocation to a multi-cell/multicast coordination entity (MCE). The MCE (for multimedia broadcast multicast services (MBMS) based resource allocation scheme) or an eNB (for single-cell point-to-multipoint (SC-PTM) resource allocation scheme) allocates resources for the DL V2X message based on the received information on resource allocation.

6 Claims, 11 Drawing Sheets

(51) Int. Cl.
*H04W 4/06* (2009.01)
*H04W 72/00* (2009.01)

(56) References Cited

U.S. PATENT DOCUMENTS

| | | | |
|---|---|---|---|
| 2013/0336120 A1 | 12/2013 | Bai | |
| 2016/0295624 A1* | 10/2016 | Novlan | H04W 76/14 |
| 2017/0201461 A1* | 7/2017 | Cheng | H04L 47/32 |
| 2018/0279267 A1* | 9/2018 | Yasukawa | H04W 72/042 |

OTHER PUBLICATIONS

ZTE, "Localized Uu based V2X architecture concerning on eMBMS," R3-160206, 3GPP TSG-RAN WG3 #91, St. Julian's, Malta, Feb. 5, 2016, see section 2.2; and figures 2.1.1 2.1.2.

LG Electronics Inc., "Way forward for Feasibility Study on LTE-based V2X Services," in RAN 3, R3-152848, 3GPP TSG-RAN WG #90, Anaheim, USA, Feb. 5, 2016, see section 5, and figures 3a-3b.

LG Electronics Inc., "Consideration on the issues for LTE-based V2X", 3GPP TSG-RAN WG3 Meeting #90, Nov. 16-20, 2015, R3-152577.

MCC, "Report of 3GPP TSG RAN WG3 meeting #90", TSG-RAN Working Group 3 meeting #91, Feb. 15-19, 2016, TSGR3#91 R3-160152.

* cited by examiner

METHOD AND APPARATUS FOR ALLOCATING RESOURCES FOR V2X MESSAGE TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2017/001276, filed on Feb. 6, 2017, which claims the benefit of U.S. Provisional Application No. 62/292,243 filed on Feb. 6, 2016, the contents of which are all hereby incorporated by reference herein in their entirety.

BACKGROUND OF THE INVENTION

Field of the Invention

The present invention relates to wireless communications, and more particularly, to a method and apparatus for allocating resources for vehicle-to-everything (V2X) message transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network.

For V2X message transmission, various resource allocation schemes, which include multimedia broadcast multicast services (MBMS) based resource allocation scheme and single-cell point-to-multipoint (SC-PTM) based resource allocation scheme, have been discussed Enhancement for those resource allocation schemes may be required.

SUMMARY OF THE INVENTION

The present invention provides a method and apparatus for allocating resources for vehicle-to-everything (V2X) message transmission in a wireless communication system. The present invention provides resource allocation scheme enhancement based on multimedia broadcast multicast services (MBMS) or single-cell point-to-multipoint (SC-PTM) for V2X message transmission.

In an aspect, a method for allocating resources for vehicle-to-everything (V2X) message transmission by a multi-cell/multicast coordination entity (MCE) in a wireless communication system is provided. The method includes receiving information on resource allocation for a downlink (DL) V2X message from a V2X application server, allocating resources for the DL V2X message based on the received information on resource allocation, and transmitting a multimedia broadcast multicast services (MBMS) scheduling information message to an eNodeB (eNB) supporting V2X communication or a road side unit (RSU) supporting V2X communication.

In another aspect, a method for determining cells for single-cell point-to-multipoint (SC-PTM) transmission of vehicle-to-everything (V2X) message by a multi-cell/multicast coordination entity (MCE) in a wireless communication system is provided. The method includes receiving information on resource allocation for a downlink (DL) V2X message from a V2X application server, determining cells for SC-PTM transmission based on the received information on resource allocation, and forwarding the received information on resource allocation to an eNodeB (eNB) managing the determined cells for SC-PTM transmission.

Resources for downlink (DL) V2X message can be allocated efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
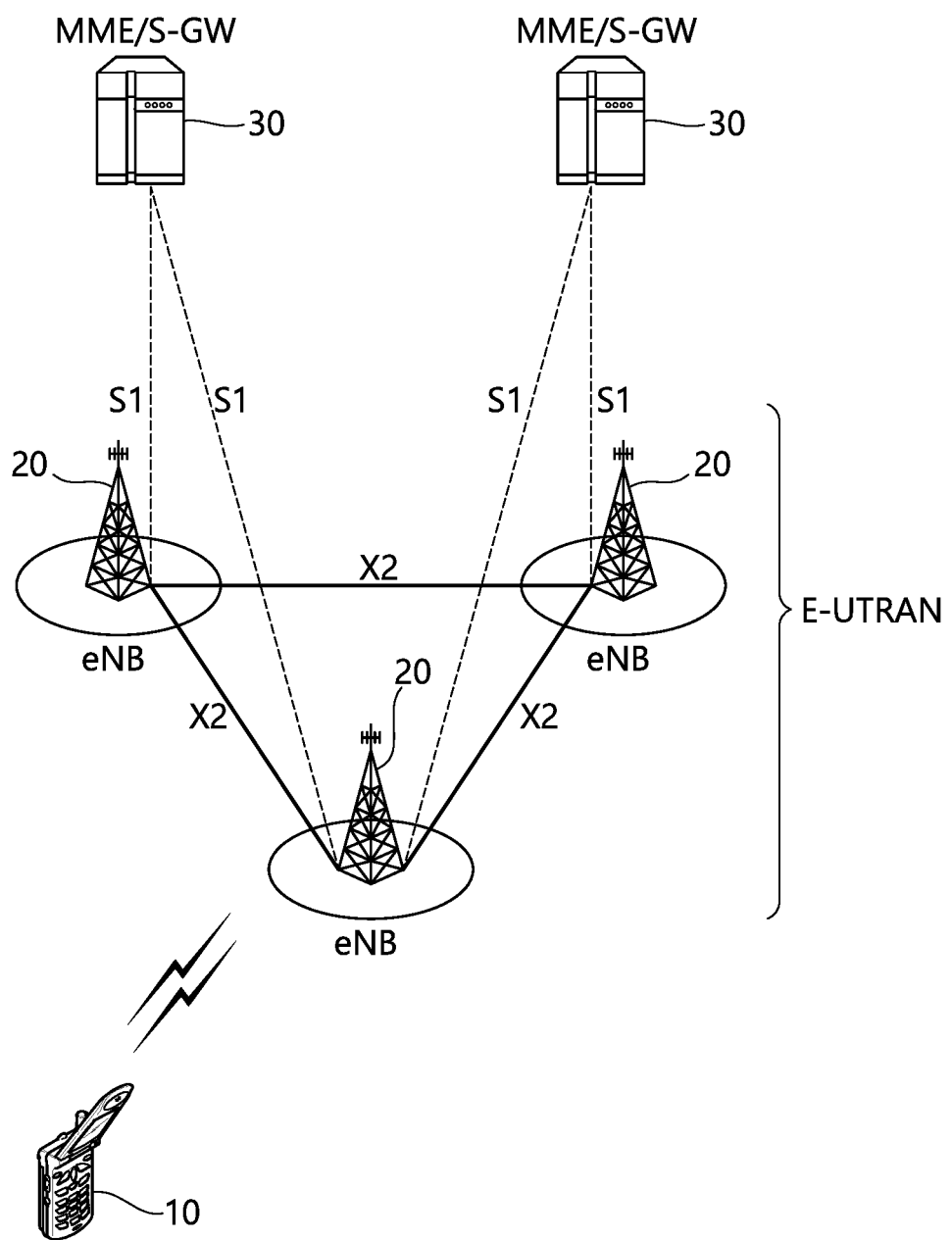
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
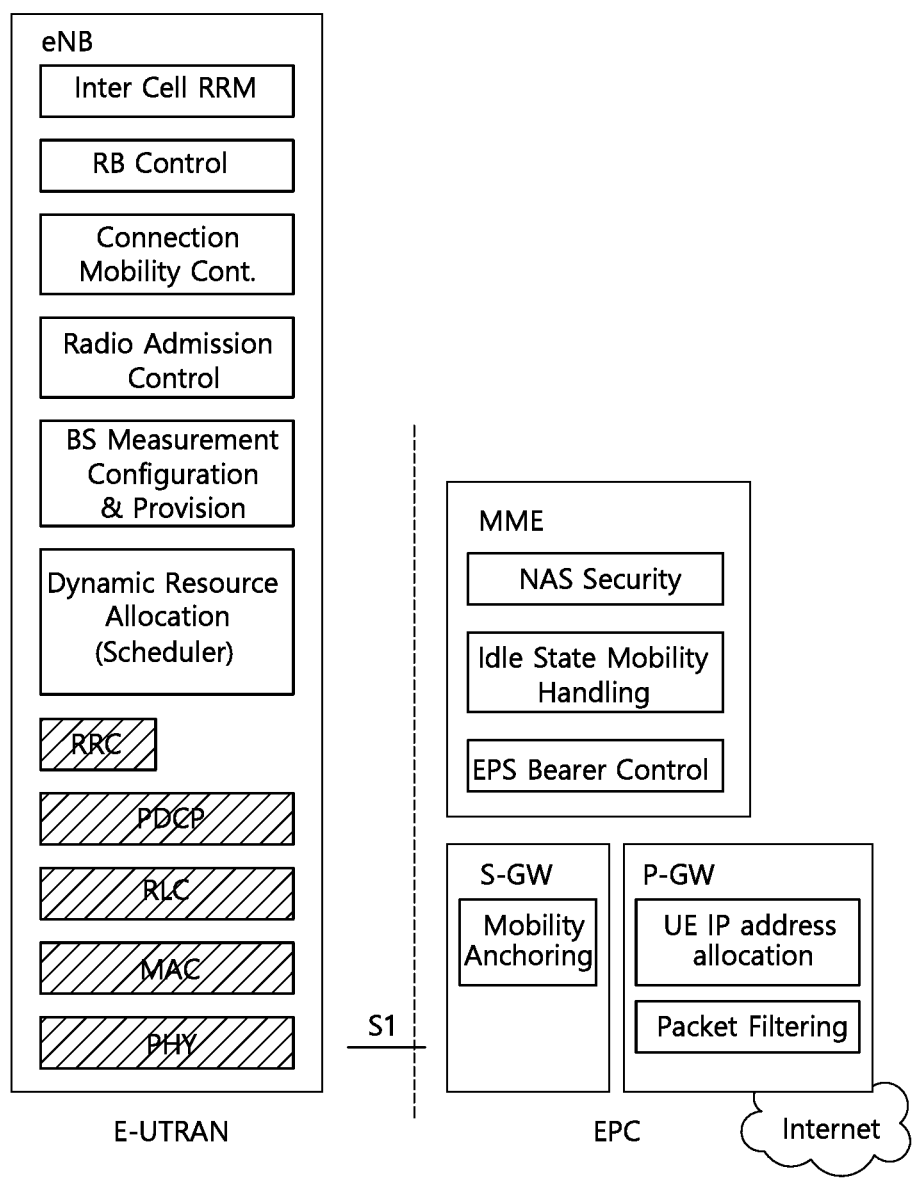
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
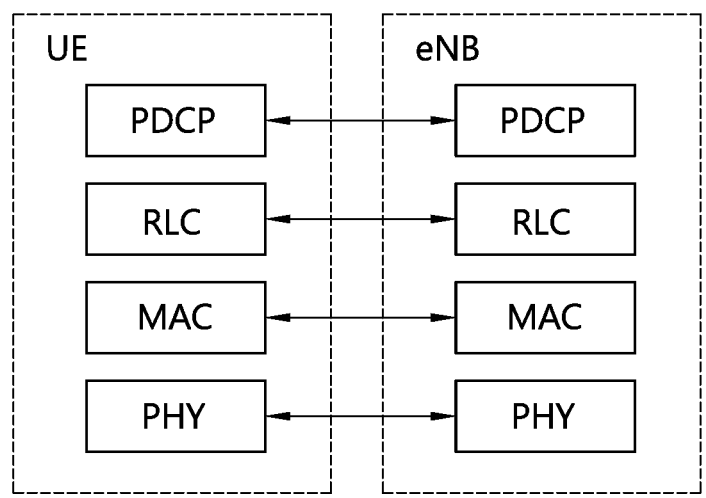
FIG. 3 shows a block diagram of a user plane protocol stack of an LTE system.
Figure 4:
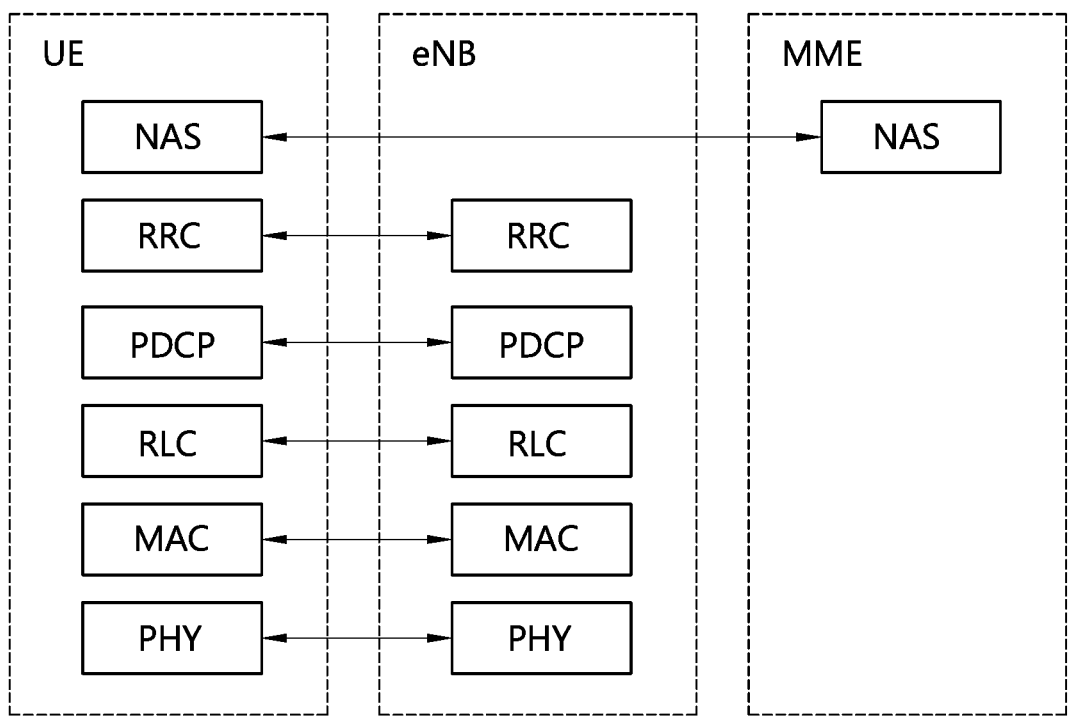
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
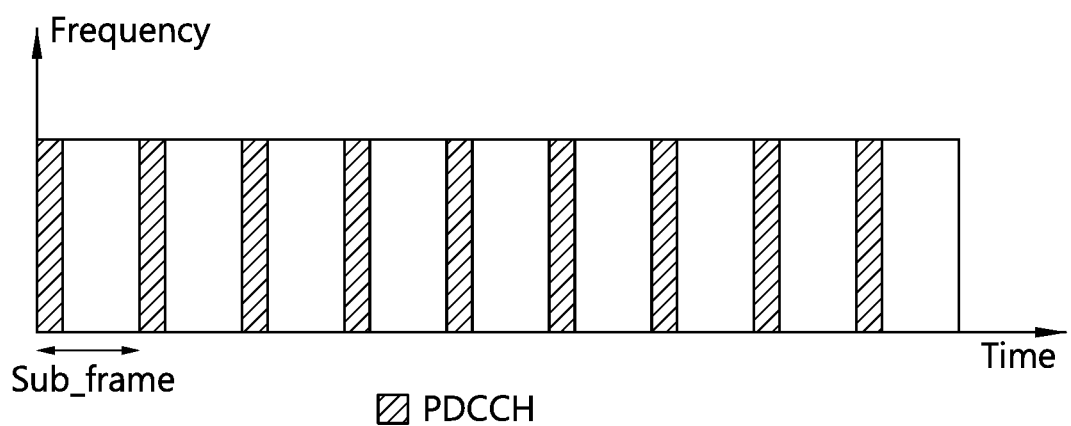
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Figure 6:
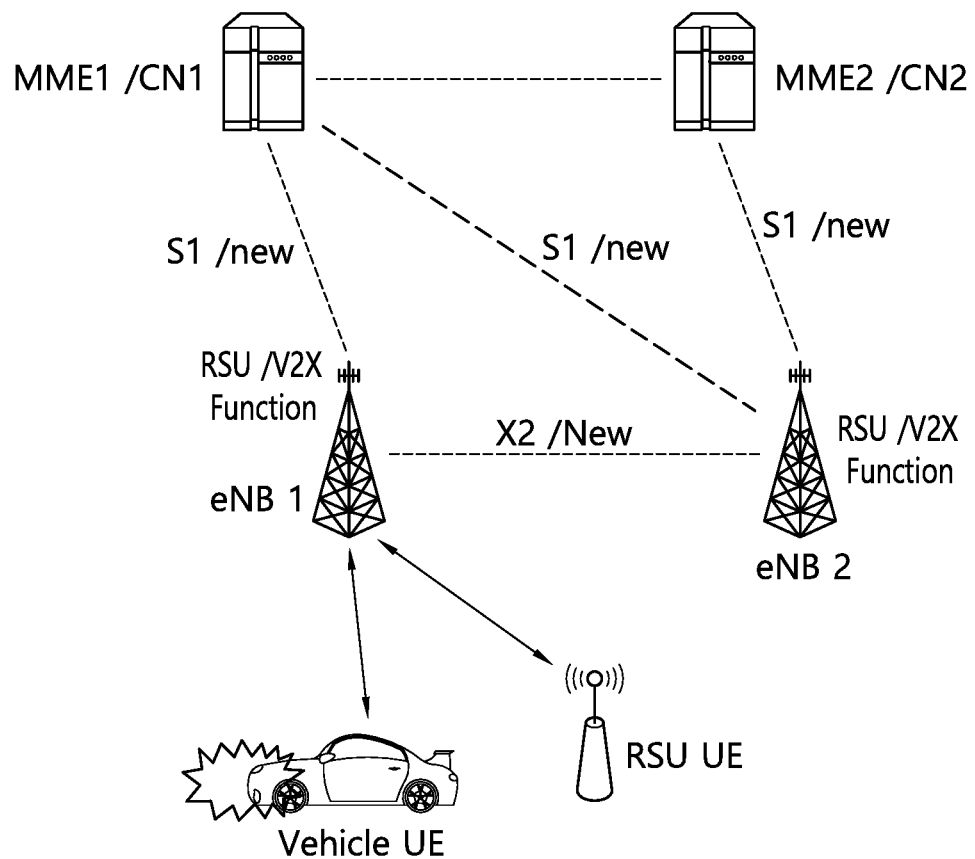
FIG. 6 shows an example of an architecture for V2X communication.

FIG. 6 shows an example of an architecture for V2X communication. Referring to FIG. 6, the existing node (i.e. eNB/MME) or new nodes (i.e. eNB type RSU) may be deployed for supporting V2X communication. The interface between nodes may be S1/X2 interface or new interface. That is, the interface between eNB1 and eNB2 may be X2 interface or new interface. The interface between eNB1/eNB2 and MME1/MME2 may be S1 interface or new interface. The eNB1/eNB2 may have RSU/V2X function.

Further, there may be two types of UE for V2X communication, one of which is a vehicle UE and the other is the UE type RSU (hereinafter, RSU UE). The vehicle UE may be like the generic UE. The RSU UE is a RSU which is implemented in the UE, and can relay or multicast or broadcast the traffic or safety information or other vehicle UEs. For V2X communication, vehicle UEs may be communicated with each other directly via PC5 interface. Alternatively, vehicle UEs may be communicated with each other indirectly via the network node. The network node may be one of an eNB, a new entity for V2X communication, a new gateway for V2X communication, an eNB type RSU, etc. The network node may not be the MME or S-GW. Alternatively, a vehicle UE may broadcast data, and the RSU UE may receive the broadcast data. The RSU and another vehicle UEs may be communicated with each other indirectly via the network node. The network node may be one of an eNB, a new entity for V2X communication, a new gateway for V2X communication, an eNB type RSU, etc. In this case, the network node may not be the MME or S-GW.

For V2X message transmission by the eNB supporting RSU/V2X function or eNB type RSU (hereinafter, just eNB/RSU) to other vehicle UEs or RSU UEs, resources should be allocated. Various resource allocation schemes, which include multimedia broadcast multicast services (MBMS) based resource allocation scheme and single-cell point-to-multipoint (SC-PTM) based resource allocation scheme, have been discussed. For MBMS based resource allocation scheme and/or SC-PTM based resource allocation scheme, MBMS/SC-PTM based architecture may be used.

Figure 7:
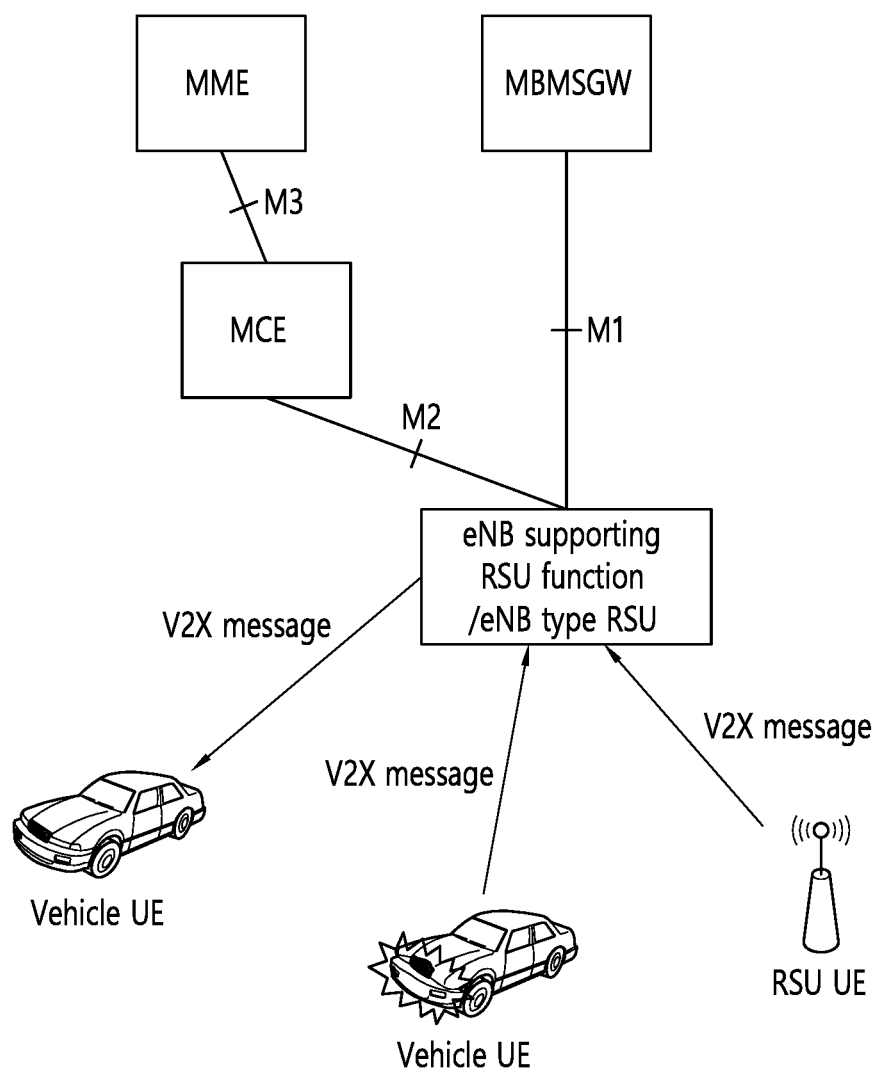
FIG. 7 shows an example of MBMS/SC-PTM based architecture for V2X communication.

FIG. 7 shows an example of MBMS/SC-PTM based architecture for V2X communication. Referring to FIG. 7, the vehicle UE or RSU UE may transmit V2X message to the eNB/RSU. The eNB/RSU may broadcast the received V2X message to other vehicle UEs or RSU UEs. Further, the eNB/RSU may connected with MBMS GW via M1 interface and connected with multi-cell/multicast coordination entity (MCE) via M2 interface. The MCE may be connected with MME via M3 interface. In the description above, the network nodes, i.e. eNB/RSU, MCE, or MME, may be replaced with a new name. Further, the interface between the network nodes may be a new interface.

Currently, resource allocation based on MBMS/SC-PTM based architecture for V2X communication shown in FIG. 7 is rather static than dynamic. Since the MCE allocates resources for V2X message transmission in MBMS based resource allocation scheme, the resources for V2X message transmission should be allocated statically. Further, even though the eNB/RSU allocates resources for V2X message transmission in SC-PTM based resource allocation scheme, which means more dynamic than MBMS based resource allocation scheme, dynamic situation of current road/traffic is hard to be considered for allocating the resources for V2X message transmission. In other words, how the MCE (in MBMS based resource allocation scheme) or the eNB/RSU (in SC-PTM based resource allocation scheme) allocates resources dynamically for transmission of V2X messages should be addressed and/or enhanced. Accordingly, a method for allocating resources for V2X message transmission based on MBMS/SC-PTM may be proposed according to the present invention.

There may be two kinds of V2X messages, one of which is called a cooperative awareness message (CAM), and the other is called a decentralized environmental notification message (DENM). CAM is a message that is periodically reported to the network, e.g. information on traffic situation. DENM is a message that is triggered by event, e.g. information on traffic accident. Hereinafter, V2X message may be any of CAM or DENM.

Figure 8:
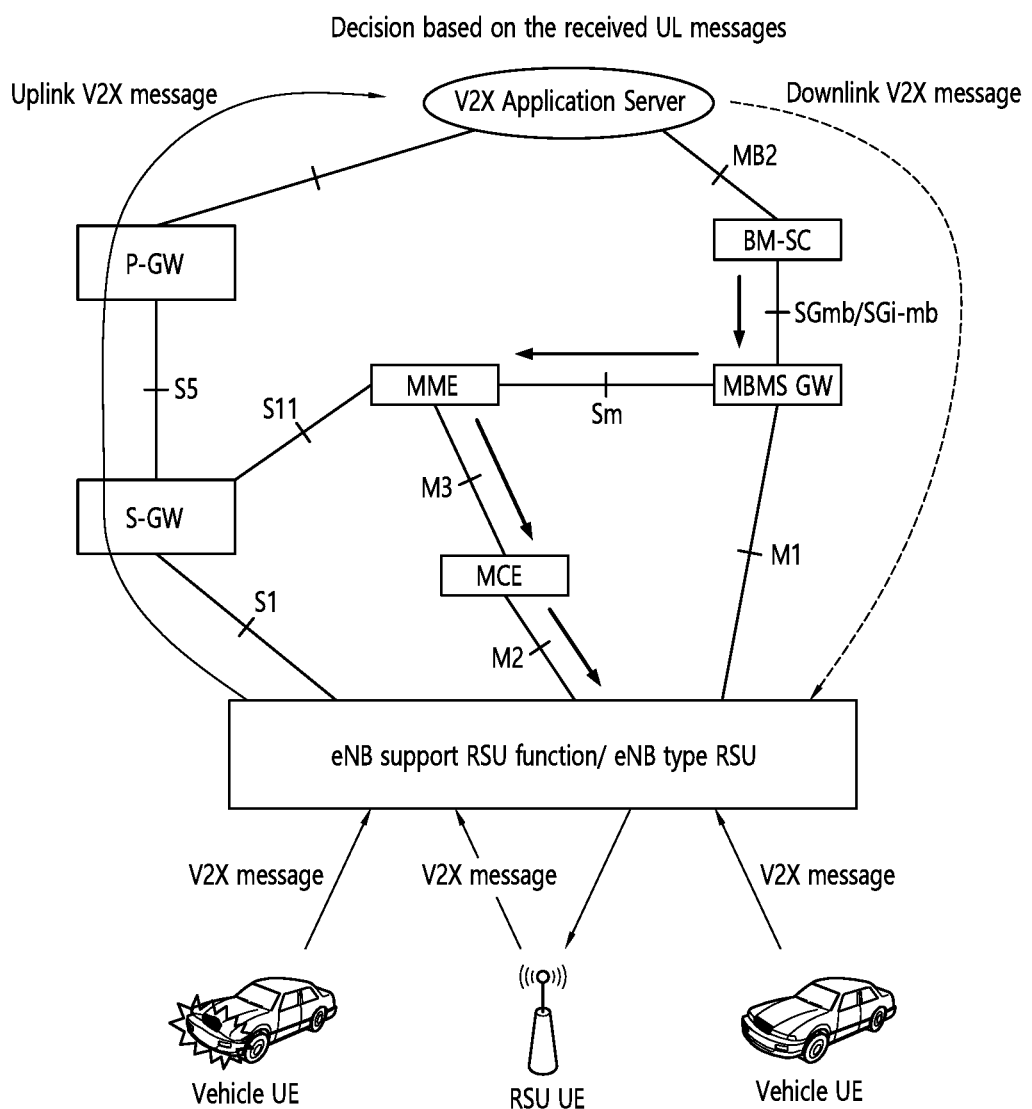
FIG. 8 shows an example of MBMS/SC-PTM based architecture for V2X communication according to an embodiment of the present invention.

FIG. 8 shows an example of MBMS/SC-PTM based architecture for V2X communication according to an embodiment of the present invention. A solution provided by the present invention is based on the fact that UL V2X message is dynamic and varies depending on time, position, and amount of vehicle information e.g. accidents, traffic, etc. That is, according to an embodiment of the present invention, UL V2X message transmitted from the vehicle UE or RSU UE is transferred to the V2X application server, and the V2X application server may decide how to transmit the DL V2X message based on the received information on the UL V2X message. Specific temporary mobile group identities (TMGIs) may also be defined for V2X service. Upon deciding how to transmit the DL V2X message based on the received information on the UL V2X message, the V2X application server may transmit information on resource allocation for DL V2X message to MCE or the eNB/RSU. In MBMS based resource allocation scheme, the MCE allocates resources for DL V2X message based on the information on the UL V2X message received from the V2X application server. In SC-PTM based resource allocation scheme, the eNB/RSU allocates resources for DL V2X message based on the information on the UL V2X message received from the V2X application server.

Hereinafter, according to embodiments of the present invention, solutions for MBMS based resource allocation scheme and SC-PTM based resource allocation scheme are described in detail, respectively.

1. Solution for MBMS Based Resource Allocation Scheme (1) Step 1

The V2X application server receives UL V2X message from the vehicle UE or RSU UE. The UL V2X message is dynamic and varies depending on time, position, and amount of vehicle information e.g. accidents, traffic, etc. The V2X application server obtains the following information on the UL V2X message.

Time information when the UL V2X message is received, and/or
  Position information where the UL V2X message is received, and/or
  Amount information on the UL V2X message, e.g. accidents, traffic, etc.

The V2X application server decides how to transmit DL V2X message based on the obtained information on the UL V2X message.

(2) Step 2

Upon deciding how to transmit DL V2X message based on the obtained information on the UL V2X message, the V2X application server transmits information on resource allocation of DL V2X message to the MCE. The information on resource allocation of DL V2X message is used to help the MCE to decide resource allocation of DL V2X message. The information on resource allocation of DL V2X message may be transmitted via broadcast multicast service center (BM-SC), MBMS GW and/or MME. The information on resource allocation of DL V2X message may include at least one of the followings.

Quality of service (QoS) or QoS related new parameters to describe the DL V2X messages, and/or
  Time related information, and/or
  Amount of DL V2X messages/message type to be transmitted, or similar information to describe DL V2X message, and/or
  Position or place of the accident, traffic, etc., e.g. cell ID of a cell in which the accident or traffic occurs, etc., and/or
  Specific TMGI for V2X service, and/or
  Service area for V2X service (3) Step 3

Upon receiving the information on resource allocation of DL V2X message from the V2X application server, the MCE decides how to do or update resource allocation based on the received information on the resource allocation of DL V2X message. The resource for DL V2X message may be allocated dynamically. For example, the resource for DL V2X message may be allocated with dynamic MCS level. For another example, the resource for DL V2X message may be allocated per subframe.

If session is not started yet, the MCE may transmit a MBMS Session Start message to eNB/RSU with the V2X TMGI indication, and the eNB/RSU may give a positive response to the MCE.

(4) Step 4

The MCE transmits or updates MBMS Scheduling Information message to the eNB/RSU. The MBMS Scheduling Information message may be transmitted periodically or event-triggered. The MBMS Scheduling Information message may include at least one the followings.

Physical multicast channel (PMCH) configuration: Allocated subframes end, MCS, MCH scheduling period, etc.
  MBMS session list per PMCH (V2X TMGI, logical channel ID)
  Multicast-broadcast single-frequency network (MB SFN) subframe configuration: radio resource information such as radio frame allocation period/offset, subframe allocation
  MBSFN area ID (5) Step 5

The eNB/RSU may use radio resources based on the received MBMS Scheduling Information message for broadcasting the DL V2X message to other vehicle UEs or RSU UEs.

The MBMS based resource allocation scheme described above may also be realized by other messages.

Figure 9:
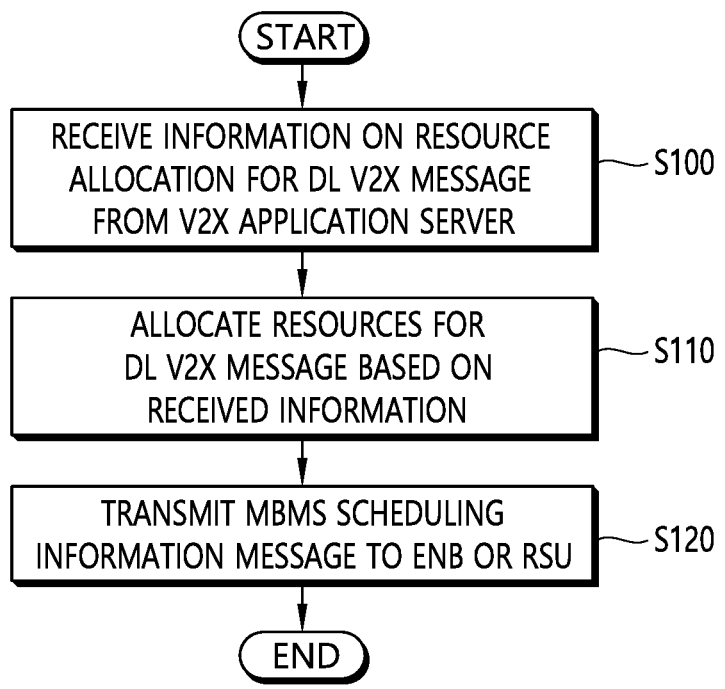
FIG. 9 shows a method for allocating resources for V2X message transmission by a MCE according to an embodiment of the present invention.

FIG. 9 shows a method for allocating resources for V2X message transmission by a MCE according to an embodiment of the present invention. The MBMS based resource allocation scheme described above may be applied to this embodiment.

In step S100, the MCE receives information on resource allocation for DL V2X message from the V2X application server. The DL V2X message may include at least one of CAM or DENM. The information on resource allocation may be determined by the V2X application server based on information UL V2X message, which is transmitted from vehicle UE or RSU UE. The information on the UL V2X message may include at least one of time information of the UL V2X message, position information of the UL V2X message, or amount information of the UL V2X message. The information on resource allocation includes at least one of QoS information of the DL V2X message, time related information, amount information of the DL V2X message, position information of an accident or traffic, a TMGI for V2X service, or service area information for V2X service.

In step S110, the MCE allocates resources for the DL V2X message based on the received information on resource allocation. The resources for the DL V2X message may be allocated with a dynamic MCS level. Or, the resources for the DL V2X message may be allocated per subframe.

In step S120, the MCE transmits a MBMS scheduling information message to the eNB supporting V2X communication or RSU supporting V2X communication. The MBMS scheduling information message may include at least one of a PMCH configuration, a MBMS session list per PMCH, a MBSFN subframe configuration, or a MBSFN area ID. The PMCH configuration, the MBMS session list per PMCH, and the MBSFN subframe configuration may be an updated PMCH configuration, an updated MBMS session list per PMCH, and an updated MBSFN subframe configuration, respectively.

2. Solution for SC-PTM Based Resource Allocation Scheme (1) Step 1

The V2X application server receives UL V2X message from the vehicle UE or RSU UE. The UL V2X message is dynamic and varies depending on time, position, and amount of vehicle information e.g. accidents, traffic, etc. The V2X application server obtains the following information on the UL V2X message.

Time information when the UL V2X message is received, and/or

Position information where the UL V2X message is received, and/or

Amount information on the UL V2X message, e.g. accidents, traffic, etc.

The V2X application server decides how to transmit DL V2X message based on the obtained information on the UL V2X message.

(2) Step 2

Upon deciding how to transmit DL V2X message based on the obtained information on the UL V2X message, the V2X application server transmits information on resource allocation of DL V2X message to the MCE. The information on resource allocation of DL V2X message is used to help the eNB/RSU to decide resource allocation of DL V2X message. The information on resource allocation of DL V2X message may be transmitted via BM-SC, MBMS GW and/or MME. The information on resource allocation of DL V2X message may include at least one of the followings.

Quality of service (QoS) or QoS related new parameters to describe the DL V2X messages, and/or Time related information, and/or Amount of DL V2X messages/message type to be transmitted, or similar information to describe DL V2X message, and/or Position or place of the accident, traffic, etc., e.g. cell ID of a cell in which the accident or traffic occurs, etc., and/or Specific TMGI for V2X service, and/or Service area for V2X service (3) Step 3

Since the SC-PTM based resource allocation scheme is used, the MCE does not decide how to allocate resources for DL V2X message. Instead, upon receiving the information on resource allocation of DL V2X message from the V2X application server, the MCE decides the cells for SC-PTM transmission based on the received information on the resource allocation of DL V2X message and information on a list of cells. The MCE may forward the received information on the resource allocation of DL V2X message to eNB/RSU. The received information on the resource allocation of DL V2X message may be forwarded to eNB/RSU via MBMS Session Start/Update message or other existing messages or new messages.

(4) Step 4

Upon receiving the information on the resource allocation of DL V2X message from the MCE, the eNB/RSU may allocate resource for DL V2X message based on received information on the resource allocation of DL V2X message. The resource for DL V2X message may be allocated dynamically. For example, the resource for DL V2X message may be allocated with dynamic MCS level. For another example, the resource for DL V2X message may be allocated per subframe. The eNB/RSU may use radio resources for broadcasting the DL V2X message to other vehicle UEs or RSU UEs.

The SC-PTM based resource allocation scheme described above may also be realized by other messages.

Figure 10:
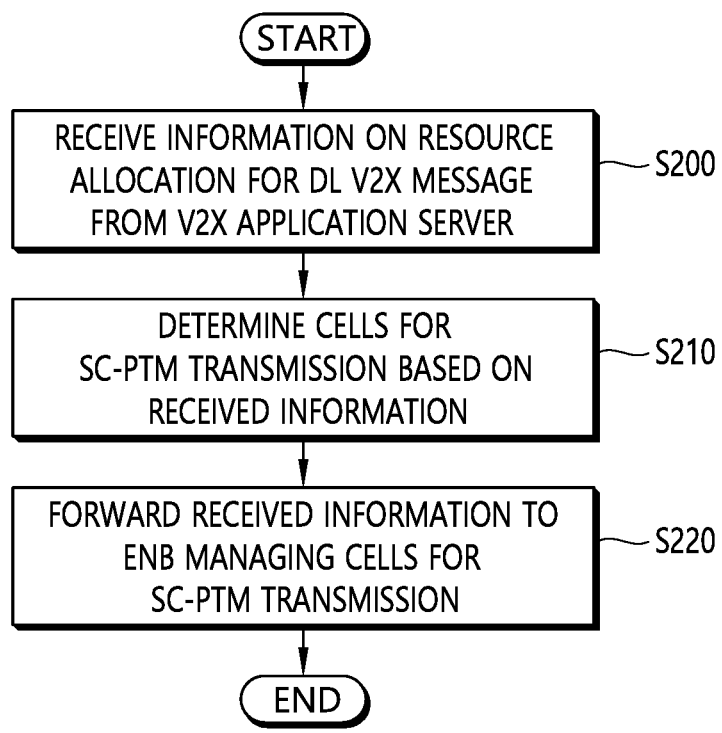
FIG. 10 shows a method for determining cells for SC-PTM transmission of V2X message by a MCE according to an embodiment of the present invention.

FIG. 10 shows a method for determining cells for SC-PTM transmission of V2X message by a MCE according to an embodiment of the present invention. The SC-PTM based resource allocation scheme described above may be applied to this embodiment.

In step S200, the MCE receives information on resource allocation for DL V2X message from the V2X application server. The DL V2X message may include at least one of CAM or DENM. The information on resource allocation may be determined by the V2X application server based on information UL V2X message, which is transmitted from vehicle UE or RSU UE. The information on the UL V2X message may include at least one of time information of the UL V2X message, position information of the UL V2X message, or amount information of the UL V2X message. The information on resource allocation includes at least one of QoS information of the DL V2X message, time related information, amount information of the DL V2X message, position information of an accident or traffic, a TMGI for V2X service, or service area information for V2X service.

In step S210, the MCE determines cells for SC-PTM transmission based on the received information on resource allocation. In step S220, the MCE forwards the received information on resource allocation to the eNB managing the determined cells for SC-PTM transmission. The information on resource allocation may be forwarded to the eNB via MBMS session start message or MBMS session update message. The eNB may allocate resources for DL V2X message with a dynamic MCS level. Or, the eNB may allocate resources for DL V2X message per subframe.

Figure 11:
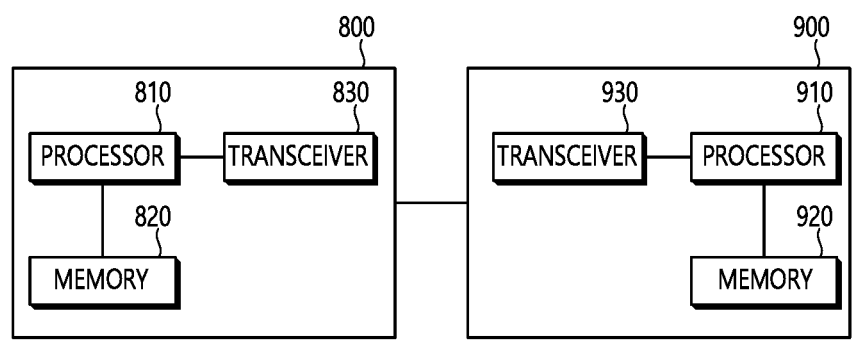
FIG. 11 shows a communication system to implement an embodiment of the present invention.

FIG. 11 shows a communication system to implement an embodiment of the present invention.

A first network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second network node 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for allocating resources for vehicle-to-everything (V2X) message transmission by a multi-cell/multicast coordination entity (MCE) in a wireless communication system, the method comprising:
    receiving information on resource allocation for a downlink (DL) V2X message from a V2X application server;
    allocating resources for the DL V2X message based on the received information on resource allocation; and
    transmitting a multimedia broadcast multicast services (MBMS) scheduling information message to an eNodeB (eNB) supporting V2X communication or a road side unit (RSU) supporting V2X communication,
    wherein the MBMS scheduling information message includes at least one of a physical multicast channel (PMCH) configuration, a MBMS session list per PMCH, a multicast-broadcast single-frequency network (MBSFN) subframe configuration, or a MBSFN area ID, and
    wherein the PMCH configuration, the MBMS session list per PMCH, and the MBSFN subframe configuration are an updated PMCH configuration, an updated MBMS session list per PMCH, and an updated MBSFN subframe configuration, respectively.

2. The method of claim 1, wherein the information on resource allocation is determined by the V2X application server based on information an uplink (UL) V2X message, which is transmitted from a vehicle user equipment (UE) or a RSU UE.

3. The method of claim 2, wherein the information on the UL V2X message includes at least one of time information of the UL V2X message, position information of the UL V2X message, or amount information of the UL V2X message.

4. The method of claim 1, wherein the information on resource allocation includes at least one of quality of service (QoS) information of the DL V2X message, time related information, amount information of the DL V2X message, position information of an accident or traffic, a specific temporary mobile group identity (TMGI) for V2X service, or service area information for V2X service.

5. The method of claim 1, wherein the resources for the DL V2X message are allocated with a dynamic modulation and coding scheme (MCS) level or per subframe.

6. The method of claim 1, wherein the DL V2X message includes at least one of a cooperative awareness message (CAM) or a decentralized environmental notification message (DENM).

* * * * *